United States Patent [19]

Aoki et al.

[11] Patent Number: 5,534,331
[45] Date of Patent: Jul. 9, 1996

[54] METHOD OF MANUFACTURING A MULTI-LAYERED CERAMIC CIRCUIT BOARD CONTAINING LAYERS OF REDUCED DIELECTRIC CONSTANT

[75] Inventors: Shigenori Aoki; Hiroshi Kamezaki; Masaharu Hida; Kishio Yokouchi, all of Kawasaki, Japan

[73] Assignee: Fujitsu Limited, Kawasaki, Japan

[21] Appl. No.: 216,978

[22] Filed: Mar. 24, 1994

Related U.S. Application Data

[62] Division of Ser. No. 21,575, Feb. 24, 1993, Pat. No. 5,324,370.

[30] Foreign Application Priority Data

Feb. 27, 1992 [JP] Japan ................................ 4-041098

[51] Int. Cl.⁶ .................................................. B32B 9/00
[52] U.S. Cl. .......................... 428/209; 428/901; 428/402; 428/206; 428/210; 361/748
[58] Field of Search .................................... 428/209, 210, 428/901, 402, 206, 313.3; 174/250; 361/748, 750

[56] References Cited

U.S. PATENT DOCUMENTS

| | | | |
|---|---|---|---|
| 4,642,148 | 2/1987 | Kurihara et al. | 156/89 |
| 4,781,968 | 11/1988 | Kellerman | 428/209 |
| 4,821,142 | 4/1989 | Ushifusa | 174/68.5 |
| 4,865,875 | 9/1989 | Kellerman | 156/89 |
| 4,867,935 | 9/1989 | Morrison, Jr. | 156/89 |
| 4,994,302 | 2/1991 | Kellerman | 264/61 |
| 5,196,384 | 3/1993 | Kamezaki et al. | 501/32 |
| 5,213,878 | 5/1993 | Moh | 428/209 |
| 5,275,889 | 1/1994 | Yokouchi | 428/209 |

FOREIGN PATENT DOCUMENTS

| | | |
|---|---|---|
| 59-111345 | 6/1984 | Japan. |
| 60-136294 | 7/1985 | Japan. |
| 60-254697 | 12/1985 | Japan. |
| 61-83674 | 4/1986 | Japan. |
| 62-206861 | 9/1987 | Japan. |
| 62-287658 | 12/1987 | Japan. |
| 2-83995 | 3/1990 | Japan. |
| 3-15160 | 6/1991 | Japan. |
| 4-124074 | 4/1992 | Japan. |
| 4-119972 | 4/1992 | Japan. |
| 4-217392 | 8/1992 | Japan. |
| 4-290492 | 10/1992 | Japan. |

*Primary Examiner*—Patrick J. Ryan
*Assistant Examiner*—Patrick R. Jewik
*Attorney, Agent, or Firm*—Armstrong, Westerman, Hattori, McLeland and Naughton

[57] ABSTRACT

A method in which a multi-layered ceramic circuit board made of a hybrid laminate consisting of green sheets containing hollow silica and green sheets containing no hollow silica is manufactured without failures occurring during the firing of the laminate. By incorporating quartz glass into a first ceramic material containing hollow silica to replace part of the hollow silica with quartz glass, the compositions of the first ceramic material and a second ceramic material containing no hollow silica are controlled so that the difference between the percentages of shrinkage on firing of the green sheets formed of the first and second ceramic materials is within 1%.

6 Claims, 2 Drawing Sheets

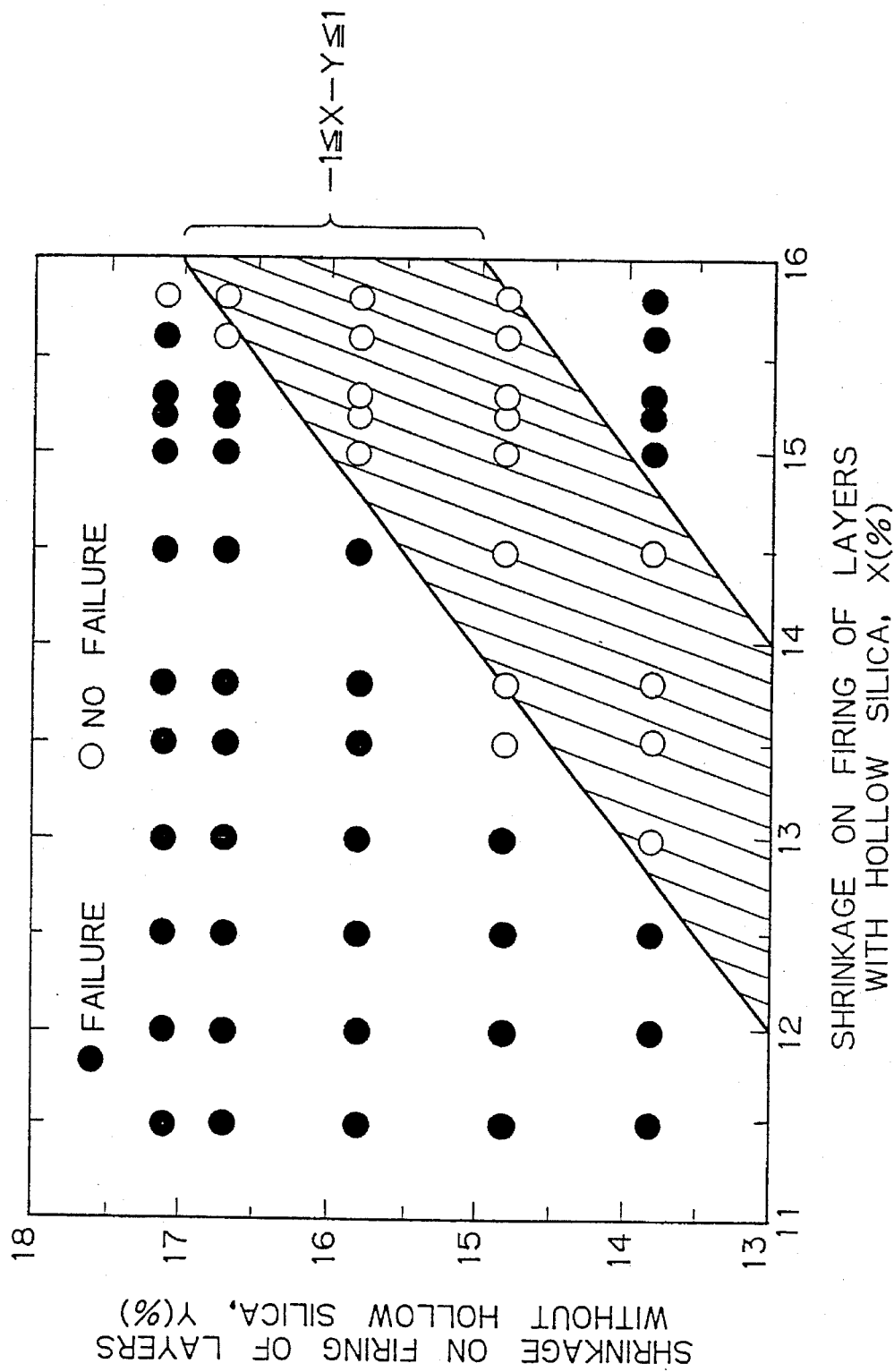

METHOD OF MANUFACTURING A MULTI-LAYERED CERAMIC CIRCUIT BOARD CONTAINING LAYERS OF REDUCED DIELECTRIC CONSTANT

This is a division of application Ser. No. 08/021,575 now U.S. Pat. No. 5,324,370, filed Feb. 24, 1993.

BACKGROUND OF THE INVENTION

1. Field of the Invention

The invention relates to a method of manufacturing a multi-layered ceramic circuit board containing layers of a reduced dielectric constant, for mounting elements such as a large scale integrated circuit, and particularly, to a method of manufacturing a multi-layered ceramic circuit board containing layers of a reduced dielectric constant of a type in which ceramic green sheets differing in their compositions are laminated in combination.

2. Description of the Related Art

In recently developed circuit boards for mounting large scale integrated circuit elements, higher speed signal transmission is preferred, and consequently, various types of circuit boards having a reduced dielectric constant have been developed, which are favorable for increasing the speed of signal transmission.

It is known in the art to use a hollow silica material contained in a ceramic circuit board to decrease the dielectric constant of the circuit board. JP 59-111345(A) discloses a low dielectric constant glass ceramic material used for circuit boards that contains a hollow ceramic material. The glass ceramic material is a composition containing a glass powder and a hollow ceramic powder such as hollow alumina powder as inorganic ingredients. The use of a hollow ceramic material, including hollow silica, as a material to reduce the dielectric constant of a ceramic circuit board is additionally disclosed in JP 61-83674(A), JP 62-206861(A), JP 2-83995(A), and U.S. Pat. No. 4,821,142. The above literature, however, does not refer to a hybrid circuit board in which non-conductive layers differing in composition, i.e., layers differing in dielectric constant, are laminated in combination.

A multi-layered circuit board that is made up of green sheets differing in composition and laminated in combination, is known. For example, JP 3-151690(A) discloses a multi-layered circuit board having a low dielectric constant and a high degree of strength, by hybrid-laminating green sheets of a low dielectric constant material and green sheets of a high strength material. No hollow silica materials are used in JP 3-151690(A).

U.S. Pat. No. 4,781,968 shows the formation of layers containing hollow glass microspheres and no microspheres on an alumina substrate. Shrinkage in a horizontal direction of laminated layers at the time of firing is not mentioned.

U.S. Pat. No. 4,620,264 discloses the use of hollow ceramic filler particles and refers to a hybrid structure as defined above. No reference is made to the shrinkage of green sheets during the firing when making a hybrid circuit board.

JP 60-254697(A) which corresponds to U.S. Pat. No. 4,761,325 discloses the use of glass ceramic material containing not less than 20% and less than 50% by weight of alumina, not less than 10% and less than 60% by weight of quartz glass, and not less than 20% and less than 40% by weight of glass or crystallized glass capable of being fired at a lower temperature than the melting point of copper, for the production of a multi-layered ceramic circuit board. However, neither the use of a hollow material nor a hybrid structure is referred to in JP 60-254697(A).

Although a green sheet containing a hollow ceramic material provides a low dielectric constant, such a green sheet causes the multi-layered circuit board produced therefrom to have a low degree of strength. By using a hybrid structure as well as a hollow ceramic material, multi-layered circuit boards were provided with a significant degree of strength and a low dielectric constant. Nevertheless, the prior multi-layered glass ceramic circuit boards having a hybrid structure and comprising low dielectric constant layers containing a hollow material are difficult to successfully manufacture, because such a hybrid multi-layered ceramic or glass ceramic circuit board suffers from delamination and/or cracks during the firing of laminated green sheets. This problem is considered in Japanese Patent Application No. 3-55188 filed Mar. 19, 1991, by way of adjusting the particle diameter of hollow microspheres contained in laminated green sheets for constituting layers of reduced dielectric constant so as to control the shrinkage difference in firing between the green sheets containing hollow microspheres and green sheets containing no hollow materials. (The content of Japanese Patent Application No. 3-55188 was published on Oct. 15, 1992, as JP 4-290492(A), after the filing date of Japanese Patent Application No. 4-41098, on which the priority of the present application is claimed.)

SUMMARY OF THE INVENTION

It is an object of the invention to provide a method of manufacturing a multi-layered ceramic circuit board that allows the production of a multi-layered ceramic circuit board containing layers of a reduced dielectric constant without causing failures such as delamination and cracks during the firing of a laminate of green sheets, from which the circuit board is made.

The inventors have found that the cause of delamination and cracks observed when a multi-layered ceramic or glass ceramic circuit board is produced using green sheets of a low dielectric constant ceramic material containing hollow silica and disposing green sheets of a ceramic material containing no hollow silica near the surfaces of the circuit board is an extraordinarily small shrinkage of the hollow silica-containing green sheet at the time of firing. The small percentage of shrinkage of a hollow silica-containing glass ceramic during firing results from the fact that the hollow silica-containing glass ceramic tends to be densely filled at the stage of forming a green sheet compared with other glass ceramics containing no hollow silica, as the hollow silica is nearly spherical in shape. The present invention is directed to the reduction of the difference between the percentages of shrinkage at firing of ceramic material layers containing hollow silica and containing no hollow silica in a hybrid laminate.

Thus, the inventive method of manufacturing a multi-layered ceramic circuit board comprises hybrid-laminating green sheets of a first ceramic powder material containing hollow silica and green sheets of a second ceramic powder material containing no hollow silica to make a hybrid laminate, in which electrically conductive layers are disposed in contact with at least the green sheets of the first ceramic powder material, and then firing the hybrid laminate to produce a multi-layered ceramic circuit board, wherein the compositions of the first and second ceramic powder materials are controlled so that the difference between the percentage of shrinkage of both green sheets during the firing thereof is within 1 percent.

In the present invention, by adjusting the compositions of the first and second ceramic materials, and particularly, by partly replacing hollow silica in a conventional ceramic material composition having a low dielectric constant with a quartz glass, the difference between the percentage of shrinkage of the green sheets of the first and second ceramic materials during the firing thereof is limited to within 1%, without increasing the dielectric constant in the fired multi-layered ceramic or glass ceramic circuit board. Advantageously, the difference between the percentage of shrinkage within 1% is achieved by a combination of a composition of a first ceramic powder material of a low dielectric constant and a composition of a second ceramic powder material, the composition of the first material containing, as inorganic ingredients, more than 0% and not greater than 55% by volume of quartz glass, in addition to 10 to 50% by volume of hollow silica, more than 0% and not greater than 65% by volume of quartz glass, 20 to 50% by volume of borosilicate glass, and 10 to 30% by volume of alumina, and the composition of the second material containing, as inorganic ingredients, more than 0% and not greater than 65% by volume of quartz glass, 20 to 60% by volume of borosilicate glass, and 10 to 50% by volume of alumina.

DESCRIPTION OF THE PREFERRED EMBODIMENTS

Figure 1:
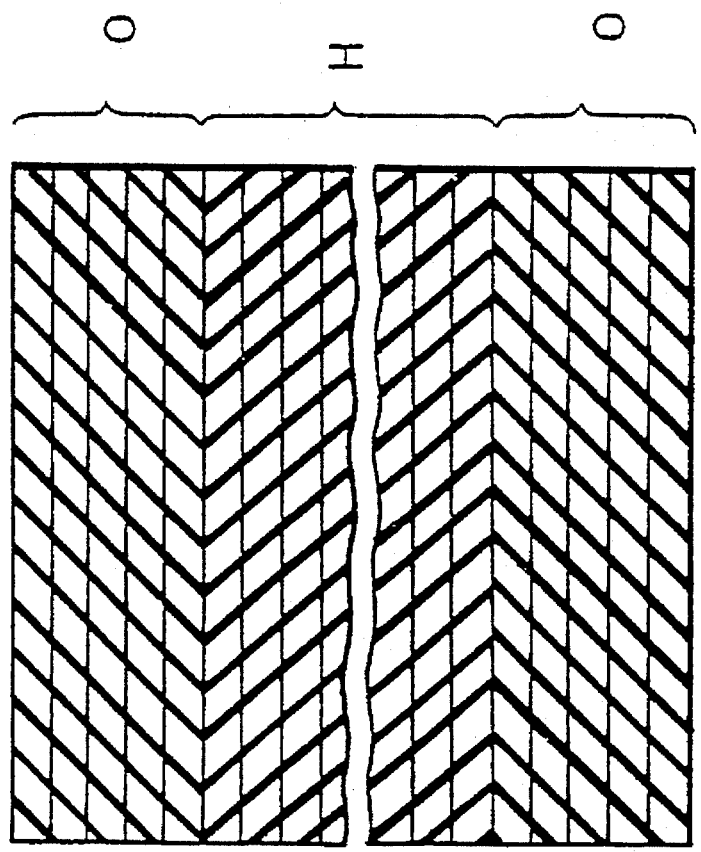
FIG. 1 schematically shows a hybrid laminate made according to the invention, and FIG. 2 diagrammatically shows the results obtained in Example 2.

The amount of quartz glass in a composition of the first ceramic material used in the invention must be more than 0% by volume. To produce a difference between percentage of shrinkage of green sheets of first and second ceramic materials during the firing thereof of 1% or less, the first ceramic material should preferably contain quartz glass in the amount of at least 5% by volume, more preferably at least 10% by volume, and most preferably at least 20% by volume. The content of quartz glass in the first ceramic material composition should not exceed 55% by volume. Increasing the quartz glass content over the upper limit leads to the reduction of the content of borosilicate glass, an increase of the dielectric constant of a fired circuit board, and the prevention of the densification of laminated green sheets by firing.

In the invention, a quartz glass that is essentially pure but containing impurities derived from the raw material during production thereof, as well as a material having a quartz ($SiO_2$) content of 96% or more, such as Vycor brand glass, can be used. In general, quartz glass that is used in the invention has an average particle diameter of 0.5 to 10 micrometers, with an average diameter of 1 to 5 micrometers being preferred.

Hollow silica in a composition of the first ceramic material in the amount of less than 10% by volume has little effect on the reduction of dielectric constant of a fired circuit board, and hollow silica in excess of 50% by volume fails to facilitate the densification of laminated green sheets by firing because of the relative reduction of the amount of borosilicate glass. The preferred amount of hollow silica is 10 to 30% by volume.

Hollow silica used in the invention may be produced from an organosilicon compound such as tetramethoxysilane ($Si(OCH_3)_4$) or tetraethoxysilane ($Si(OC_2H_5)_4$), using the formation of bubbles during the thermal decomposition of a starting organosilicon compound. The use of hollow silica having a particle diameter of 20 micrometers or less can favorably reduce the dielectric constant in the resultant glass ceramic circuit board.

The composition of the first ceramic material contains 20 to 50% by volume of borosilicate glass. In the case of the borosilicate glass content of less than 20% by volume, the densification of a green sheet during the firing thereof is not effectively facilitated. On the other hand, the composition containing in excess of 50% by volume is prone to flow during the firing of green sheets, making it difficult to obtain a circuit board having a shape and size as desired. Preferably, the content of borosilicate glass in the composition of the first ceramic material is 30 to 45% by volume. Generally, borosilicate glass in the first ceramic material composition preferably has an average particle diameter of 0.5 to 10 micrometers, with the range of 1 to 5 micrometers being most preferable.

In the composition of the first ceramic material, 10 to 30% by volume of alumina is present. In the content of alumina of less than 10% by volume, borosilicate glass contained in the composition tends to be crystallized. The content of alumina exceeding 30% by volume is not preferable because of the increase of dielectric constant in the fired circuit board. The preferred alumina content in the first ceramic material composition is 10 to 20% by volume. On average, the particle diameter of alumina is generally 0.5 to 10 micrometers, and preferably 1 to 5 micrometers.

The composition of a second ceramic powder material used in the invention comprises ingredients similar to those contained in the composition of the first ceramic powder material as inorganic ingredients thereof, except that the composition contains no hollow silica, i.e., contains 20 to 60% by volume of borosilicate glass, more than 0% and not greater than 65% by volume of quartz glass, and 10 to 30% by volume of alumina.

As in the composition of the first ceramic material, the content of quartz glass in the composition of the second ceramic powder material is limited to an amount of more than 0% and not greater than 65% by volume, the preferable amount being in the range of 20 to 50% by volume. Similarly, quartz glass in the second ceramic material composition generally has an average particle diameter of 0.5 to 10 micrometers, with a preferred particle diameter being in the range of 1 to 5 micrometers.

Also as in the composition of the first ceramic material, the content of borosilicate glass in the composition of the second ceramic material is in the range of 20 to 60% by volume, and the preferred content thereof is 30 to 45% by volume. Similarly, borosilicate glass used in the second ceramic material composition generally has an average particle diameter of 0.5 to 10 micrometers, and preferably 1 to 5 micrometers.

Likewise, in the composition of the second ceramic material, alumina exists in an amount of 10 to 50% by volume. The preferred alumina content is 10 to 30% by volume. An average particle diameter of alumina is generally in the range of 0.5 to 10 micrometers, and preferably 1 to 5 micrometers.

To make a multi-layered ceramic circuit board according to the present invention, green sheets of the first and second ceramic materials are laminated in such a manner that the green sheet layers of the first ceramic material are interposed between several layers of green sheet of the second ceramic material positioned under the layers of green sheet of the first ceramic material and several layers of green sheet of the second ceramic material placed on the layers of the green sheet of the first ceramic material, thereby making a hybrid laminate, wherein electrically conductive layers made of, e.g., copper, by a known process in the art have been disposed on the green sheets of the first ceramic material prior to the lamination, and via-holes have also been made in each of the green sheets of the first ceramic material. The hybrid laminate is then fired to produce a multi-layer ceramic circuit board in a known manner. Alternatively, the laminate of green sheets of the first ceramic material is divided into two or more sections by inserting therebetween a layer or layers of green sheet of the second ceramic material. This embodiment makes it possible for the resultant circuit board to be strengthened.

A person with ordinary skill in the art would be aware of the processes used in the present invention when making green sheets, a laminate of green sheets, electrically conductive layers, via-holes, and fired laminates, and a further detailed description of these processes herein is not necessary.

The invention will be further described in the following examples.

EXAMPLE 1

This example illustrates the preparation of compositions containing no hollow silica (compositions A1–A5) and compositions containing hollow silica (compositions B1–B18), including percentages of shrinkage in firing of the green sheets formed of the compositions and dielectric constants of the fired green sheets.

Slurry compositions were prepared by mixing alumina powder (average particle diameter 3 micrometers), borosilicate glass (BSG) powder (average particle diameter 3 microns), quartz glass powder (average particle diameter 3 micrometers), and hollow silica powder (average particle diameter 15 micrometers) in the volumetric ratios indicated in Table 1, adding organic ingredients, and kneading the mixture in a mixer. As the organic ingredients, 10 g of polyvinyl butyral (binder), 10 g of dibutyl phthalate (plasticizer), and 300 g of ethanol (solvent) were used for each 100 milliliters of combined inorganic ingredients.

Green sheets having a thickness of 300 micrometers were formed from the prepared compositions using a doctor blade process. Each of the green sheets was fired in the air at 1000° C. The percentages of shrinkage and dielectric constants ($\epsilon$) of the fired green sheets were determined. The results are shown in Table 1.

TABLE 1

| Comp. | Alumina | BSG | Quartz Glass | Hollow Silica | Shrink. (%) | $\epsilon$ |
|---|---|---|---|---|---|---|
| A1 | 15 | 20 | 65 | 0 | 13.8 | 4.2 |
| A2 | 15 | 30 | 55 | 0 | 14.8 | 4.7 |
| A3 | 15 | 40 | 45 | 0 | 15.8 | 5.1 |
| A4 | 15 | 50 | 35 | 0 | 16.7 | 5.3 |
| A5 | 15 | 60 | 25 | 0 | 17.1 | 5.4 |
| B1 | 15 | 20 | 55 | 10 | 13.5 | 4.0 |
| B2 | 15 | 30 | 45 | 10 | 14.5 | 4.5 |

Inorganic Ingredients (vol %)

TABLE 1-continued

| Comp. | Alumina | BSG | Quartz Glass | Hollow Silica | Shrink. (%) | $\epsilon$ |
|---|---|---|---|---|---|---|
| B3 | 15 | 40 | 35 | 10 | 15.6 | 4.9 |
| B4 | 15 | 50 | 25 | 10 | 15.8 | 5.2 |
| B5 | 15 | 20 | 45 | 20 | 13.0 | 3.8 |
| B6 | 15 | 30 | 35 | 20 | 14.5 | 4.3 |
| B7 | 15 | 40 | 25 | 20 | 15.3 | 4.6 |
| B8 | 15 | 50 | 15 | 20 | 15.2 | 4.8 |
| B9 | 15 | 20 | 35 | 30 | 13.0 | 3.5 |
| B10 | 15 | 30 | 25 | 30 | 13.8 | 4.1 |
| B11 | 15 | 40 | 15 | 30 | 15.0 | 4.4 |
| B12 | 15 | 50 | 5 | 30 | 15.0 | 4.6 |
| B13 | 15 | 20 | 25 | 40 | 12.5 | 3.3 |
| B14 | 15 | 30 | 15 | 40 | 13.5 | 3.8 |
| B15 | 15 | 40 | 5 | 40 | 14.5 | 4.1 |
| B16 | 15 | 20 | 15 | 50 | 12.0 | 3.0 |
| B17 | 15 | 30 | 5 | 50 | 13.0 | 3.5 |
| B18 | 15 | 20 | 5 | 60 | 11.5 | 2.7 |

Inorganic Ingredients (vol %)

EXAMPLE 2

Hybrid laminates were made using the green sheets (100×100 mm, 300 micrometers thickness) formed from the compositions prepared in Example 1. Each laminate had a hybrid structure in which 10 green sheets of the composition group B containing hollow silica were interposed between 5 upper green sheets and 5 lower green sheets of the composition group A containing no hollow silica. The fabricated hybrid laminate is schematically shown in FIG. 1. (FIG. 1 shows layers of green sheets without hollow silica O and green sheets with hollow silica H.) In each of the hybrid laminates, no electrically conductive layers were provided, for the sake of simplicity.

The laminates were pressed at 50° C. and 10 MPa, and then fired in the air at 1000° C. The resultant multi-layer circuit boards were checked for delamination and cracks. The results are shown in Table 2. In the table, the difference between percentages of shrinkage on firing of each combination of green sheets belonging to group A (containing no hollow silica) and group B (containing hollow silica) is shown, along with the results of a check for failure (delamination and/or cracks), the signs "n" and "f" represent no failure and failure observed, respectively. Further, in this table, figures in the parentheses following the symbols A1 to A5 and B1 to B18 representing the compositions of the green sheets indicate the percentages of shrinkage on firing of the respective sole green sheets.

TABLE 2

| Inner Layers | Outer Layers | | | | |
|---|---|---|---|---|---|
| | A1 (13.8) | A2 (14.8) | A3 (15.8) | A4 (16.7) | A5 (17.1) |
| B1 (13.5) | 0.3 n | 1.3 f | 2.3 f | 3.2 f | 3.6 f |
| B2 (14.5) | −0.7 n | 0.3 n | 1.3 f | 2.2 f | 2.6 f |
| B3 (15.6) | −0.8 f | −0.8 n | 0.2 n | 1.1 n | 1.5 f |
| B4 (15.8) | −2.0 f | −1.0 f | 0.0 f | 0.9 n | 1.3 n |
| B5 (13.0) | 0.8 n | 1.8 f | 2.8 f | 3.7 f | 4.1 f |
| B6 (14.5) | −0.7 n | 0.3 n | 1.3 f | 2.2 f | 2.6 f |
| B7 (15.3) | −1.5 f | −0.5 n | 0.5 f | 1.4 f | 1.8 f |
| B8 (15.2) | −1.4 f | −0.4 n | 0.6 n | 1.5 f | 1.9 f |
| B9 (13.0) | 0.8 n | 1.8 f | 2.8 f | 3.7 f | 4.1 f |
| B10 (13.8) | 0.0 n | 1.0 n | 2.0 f | 2.9 f | 3.3 f |
| B11 (15.0) | −1.2 f | −0.2 f | 0.8 n | 1.7 f | 2.1 f |
| B12 (15.0) | −1.2 f | −0.2 n | 0.8 n | 1.7 f | 2.1 f |
| B13 (12.5) | 1.3 f | 2.3 f | 3.3 f | 4.2 f | 4.6 f |

TABLE 2-continued

| Inner | Outer Layers | | | | |
|---|---|---|---|---|---|
| Layers | A1 (13.8) | A2 (14.8) | A3 (15.8) | A4 (16.7) | A5 (17.1) |
| B14 (13.5) | 0.3 n | 1.3 n | 2.3 f | 3.2 f | 3.6 f |
| B15 (14.5) | −0.7 n | 0.3 n | 1.3 f | 2.2 f | 2.6 f |
| B16 (12.0) | 1.8 f | 2.8 f | 3.8 f | 4.7 f | 5.1 f |
| B17 (13.0) | 0.8 n | 1.8 f | 2.8 f | 3.7 f | 4.1 f |
| B18 (11.5) | 2.3 f | 3.3 f | 4.3 f | 5.2 f | 5.6 f |

It can be seen that by producing a difference between the percentages of shrinkage on firing of the green sheets with and without hollow silica of 1 percent or less, failures such as delamination and cracks in the produced multi-layered glass ceramic circuit board can be successfully prevented. This is more plainly demonstrated in FIG. 2, which diagrammatically shows the results presented in Table 2.

EXAMPLE 3

For multi-layered circuit boards obtained by the hybrid lamination of green sheets corresponding to the compositions A3 and B7, and those corresponding to the compositions A2 and B10, the dielectric constants of the glass ceramic layers containing hollow silica were determined by the measurement of the transmission rate of a signal supplied to the electrically conductive layer formed on the glass ceramic layer. The obtained dielectric constant data is 4.7 for the multi-layered circuit board formed from the green sheet compositions A3 and B7, and 4.2 for the green sheet compositions A2 and B10. In the combination of the green sheets corresponding to the compositions A1 and B9, a multi-layer circuit board was obtained having a dielectric constant in the order of 3.5.

Table 3 shows dielectric constant data and surface roughness after the grinding or polishing of conventional, no hollow silica containing multi-layered glass ceramic circuit boards having a non-hybrid structure, hollow silica containing multi-layered glass ceramic circuit boards having a non-hybrid structure, and circuit boards having a hybrid structure according to the invention.

TABLE 3

| Circuit Boards | Dielectric Const. | Surface Rough. (micrometers) |
|---|---|---|
| Conventional, no hollow silica, non-hybrid | >4.1 | >0.01 |
| hollow silica, non-hybrid | >2.9 | >0.1 |
| hollow silica, hybrid structure (present invention) | >3.5 | >0.01 |

As can be seen from the table, the dielectric constant in the glass ceramic circuit boards produced by the invention is substantially lower than that of the conventional glass ceramic circuit boards containing no hollow silica. It will also be seen that the multi-layered glass ceramic circuit boards produced by the invention have a surface roughness after grinding comparable to that obtained in the conventional circuit board containing no hollow silica, whereas the hollow silica containing multi-layered glass ceramic circuit boards having a non-hybrid structure have a much rougher surface after grinding because of the hollow silica exposed at the surface of the circuit board.

Thus, the invention makes it possible to reduce the dielectric constant of portions for signal transmission in a multi-layered circuit board, and accordingly, transmit signals at a higher speed. The reduced surface roughness of the multi-layered circuit board according to the invention allows a thin metallized layer for interconnection to be readily formed on the surface of the circuit board, which is very difficult in a hollow silica containing multi-layered ceramic circuit board having a non-hybrid structure due to the increased roughness of the grinded surface. Electronic elements such as a large scale integrated circuit may be easily mounted on the multi-layer ceramic circuit board produced by the inventive method, as follows: a surface of the produced circuit board is polished; a thin metallic film is formed on the polished surface; and electronics elements are then mounted on the circuit board. It would be unnecessary for a person with ordinary skill in the art to describe such a procedure in more detail.

We claim:

1. A multi-layered ceramic circuit board comprising hybrid-laminated ceramic layers of a first ceramic powder material containing hollow silica and of a second ceramic powder material containing no hollow silica, the ceramic layers having resulted from firing the hybrid-laminated layers of green sheets of the first ceramic powder material containing hollow silica interposed between overlaying and underlying layers of green sheets of the second ceramic powder material containing no hollow silica, and electrically conductive layers being disposed in contact with at least the ceramic layers resulting from firing the green sheets of the first ceramic powder material containing the hollow silica, wherein the compositions of the first and second ceramic powder materials are controlled, so that the difference between the percentage of shrinkage of both green sheets during the firing thereof is within 1%; wherein the first ceramic powder material contains, as inorganic ingredients, 10 to 50% by volume of hollow silica, 20 to 50% by volume of borosilicate glass, more than 0% and not greater than 55% by volume of quartz glass, and 10 to 30% by volume of alumina; and the second ceramic powder material contains, as inorganic ingredients, 20 to 60% by volume of borosilicate glass, more than 0% and not greater than 65% by volume of quartz glass, and 10 to 50% by volume of alumina.

2. The circuit board of claim 1, which is free from failure resulting from the firing of the hybrid-laminated green sheets.

3. The circuit board of claim 1, wherein the first ceramic powder material contains, as inorganic ingredients, 10 to 30% by volume of hollow silica, 30 to 45% by volume borosilicate glass, 10 to 40% by volume of quartz glass, and 10 to 20% by volume of alumina.

4. The circuit board of claim 1, wherein the second ceramic powder material contains, as inorganic ingredients, 30 to 45% by volume of borosilicate glass, 20 to 50% by volume of quartz glass, and 10 to 30% by volume of alumina.

5. The circuit board of claim 1, wherein at least one surface of the multi-layered ceramic circuit board is polished, and has a surface roughness of approximately 0.01 micrometers.

6. The circuit board of claim 1, which has a dielectric constant of approximately 3.5.

* * * * *